Patented July 19, 1949

2,476,548

UNITED STATES PATENT OFFICE 2,476,548

PREPARATION OF TRIAZINYLNITRILES

Ingenuin Hechenbleikner, Stamford, Conn., assignor to American Cyanamid Company, New York, N. Y., a corporation of Maine No Drawing. Application January 13, 1945, Serial No. 572,755

11 Claims. (Cl. 260—249.5)

This invention relates to new and useful triazines, and more particularly to the production of new cyanoalkyl aminotriazines.

The cyanoalkylaminotriazines of this invention may be represented by the formula

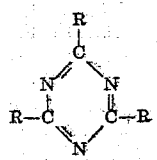

where one R represents

and the remaining R's are selected from the group consisting of

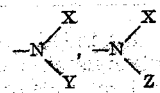

and amino, X being chosen from the group consisting of hydrogen, alkyl, cycloalkyl, aryl, and cyanoalkyl, Z being chosen from the group consisting of alkyl, cycloalkyl, aryl, and cyanoalkyl, and Y being cyanoalkyl.

Illustrative examples of the X, Y, and Z groups which have the meanings above given are:

For cyanoalkyl: cyanomethyl, β-cyanoethyl, γ-cyanopropyl, β-cyano-α-methylethyl, etc.
For alkyl: methyl, ethyl, propyl, isopropyl, butyl, allyl, hexyl, dodecyl, etc.
For cycloalkyl: cyclohexyl, cyclohexenyl, cyclopentyl, cycloheptyl, etc.
For aryl: phenyl, diphenyl, naphthyl, tolyl, xylyl, etc.

These cyanoalkylaminotriazines are prepared by reacting an aminonitrile of the formula

where X and Y have the meanings above given, with chlorotriazines of the formulae

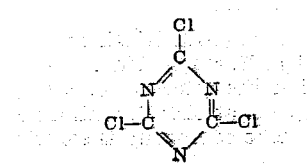 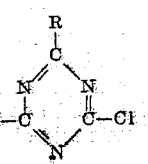

and

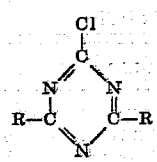

where R is chosen from the group consisting of

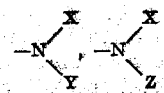

and amino, where X, Y, and Z have the meanings above given.

Alternative methods for preparing these types of cyanoalkylaminotriazines are those in which ammonia or an amine of the formula

where X and Z have the meanings above given, is reacted with triazines of the formulae

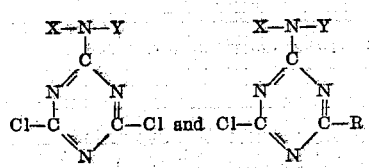

where R is chosen from the group consisting of

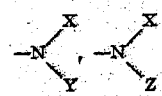

and amino, where X, Y, and Z have the meanings above given.

These cyanoalkylaminotriazines may be prepared in a number of liquid media, and it is not necessary that the chlorotriazine for the reaction be completely in solution. However, if undissolved chlorotriazine is in suspension it is desirable to have the solid in a finely divided state so as to be more easily available for reaction.

In the preparation of the cyanoalkylaminotriazines, hydrogen chloride is split off and must be removed from the reaction. This is accomplished by adding HCl-acceptors which include such materials as an excess of the amine used in the reaction, sodium bicarbonate, and sodium hydroxide. Other HCl-acceptors may be used with equal success, but for the sake of economy and easy availability the above are preferred.

The cyanoalkylaminotriazines herein described are useful in the manufacture of chemical intermediates, chemotherapeutic agents, dyes, insecticides, synthetic resins, plastics, and other materials in which substituted triazines carrying cyanoalkylamino groups are desirable. The following examples will illustrate the preparation of typical cyanoalkylaminotriazine materials described herein.

EXAMPLE 1

*Methods of preparing 2 - butylamino - 4,6 - bis-cyanomethylamino-1,3,5-triazine*

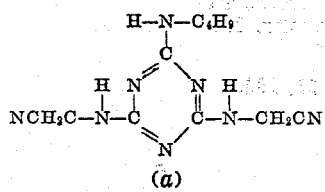

(a)

| Reactants | Molar Ratio |
| --- | --- |
| 2-Butylamino-4,6-dichloro-1,3,5 triazine | 1.0 |
| Glycinonitrile | 4.0 |

The dichlorotriazine is suspended in sufficient liquid phenol so that the reaction mixture may be stirred easily. One half of the glycinonitrile is added slowly at a temperature of about 45° C., and the remainder of the glycinonitrile is added carefully while the reaction mixture is heated to 90–100° C. The total addition and heating time is 3–4 hours, after which the reaction mixture is poured into water. The desired triazine is precipitated and the hydrochloride of the glycinonitrile dissolves. After recovery and purification the colorless, odorless, crystalline solid melts at 138–140° C. The compound is soluble in hot water, alcohol, benzene, and in dilute acids, but insoluble in hexane.

(b)

| Reactants | Molar Ratio |
| --- | --- |
| 2-Butylamino-4-chloro-6-cyanomethylamino-1,3,5-triazine | 1.0 |
| Glycinonitrile | 2.0 |

The chlorotriazine is suspended in sufficient liquid phenol so that the reaction mixture may be stirred easily. The glycinonitrile is added carefully and the temperature is raised to and maintained at 90–100° C. for 2.5 hours. When the reaction mixture is poured into cold water, the hydrochloride of the glycinonitrile dissolves and a precipitate forms which, after recovery and purification, is identified as the desired triazine.

(c)

| Reactants | Molar Ratio |
| --- | --- |
| 2-Chloro-4,6-bis-cyanomethylamino-1,3,5-triazine | 1.0 |
| Butylamine | 2.0 |

The triazine is suspended in 2-ethoxy-ethanol-1, herein and after sometimes referred to as Cellosolve, and the butylamine is added carefully. A slight temperature rise is observed, and the temperature is raised to and maintained at 100° C. for 1–2 hours. The reaction mixture is diluted with excess cold water to precipitate a solid which after recovery and purification, is identified as the desired triazine.

EXAMPLE 2

*Methods of preparing 2,4-bis-cyanomethylamino-6-diethylamino-1,3,5-triazine*

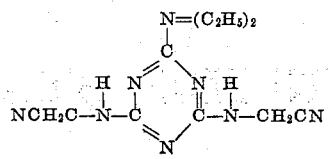

(a)

| Reactants | Molar Ratio |
| --- | --- |
| 2,4-Dichloro-6-Diethylamino-1,3,5-triazine | 1.0 |
| Glycinonitrile | 4.0 |

The procedure for preparing this triazine is the same as that described in Example 1 (a). After recovery and purification the colorless, odorless, crystalline solid melts at 158–162° C. The compound is soluble in hot water, benzene, and in dilute acids, but insoluble in ligroin.

(b)

The procedure for preparing this triazine is the same as that described in Example 1(b). The 2-chloro-4-cyanomethylamino- 6 - diethylamino-1,3,5-triazine and the glycinonitrile are reacted together in liquid phenol in a 1:2 molar ratio. After recovery and purification the compound is identified as the desired triazine.

(c)

| Reactants | Molar Ratio |
| --- | --- |
| 2-Chloro-4,6-bis-cyanomethylamino-1,3,5-triazine | 1.0 |
| Acetone | 6.8 |
| Diethylamine | 2.0 |

The triazine is suspended and stirred in the acetone and the diethylamine is added at room temperature. The temperature rises slowly, and by means of the occasional application of an ice bath, the temperature is maintained at 40–50° C. When the reaction ceases to be exothermic, the reaction mixture is diluted with a large excess of cold water which contains an excess of sodium carbonate, and the desired triazine precipitates. After recovery and purification the crystalline solid is identified as the desired triazine.

EXAMPLE 3

*Methods of preparing 2-amino-4,6-bis-cyanomethylamino-1,3,5-triazine*

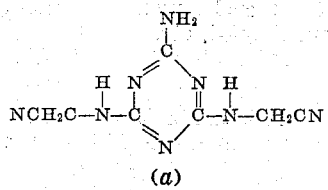

(a)

| Reactants | Molar Ratio |
| --- | --- |
| 2-Amino-4,6-dichloro-1,3,6-triazine | 1.0 |
| Glycinonitrile | 4.0 |

The procedure for preparing this triazine is the same as that described in Example 1(a). After recovery and purification the colorless, odorless, crystalline solid decomposes at 220° C. without a definite melting point. The compound is soluble in hot water, alcohol, and in dilute acids, but insoluble in benzene and hexane.

(b)

The procedure for preparing this triazine is the same as that described in Example 1(b). The 2-amino-4-chloro-6-cyanomethylamine-1,3,5-triazine and the glycinonitrile are reacted together in liquid phenol in a 1:2 molar ratio. After recovery and purification the solid is identified as the desired triazine.

(c)

| Reactants | Molar Ratio |
|---|---|
| 2-Chloro-4,6-bis-cyanomethylamino-1,3,5-triazine | 1.0 |
| Aqueous ammonia, conc. | 5.0 |

The chlorotriazine is suspended in cold ethanol and the aqueous ammonia is added. The reactor is then sealed and the temperature is raised to and maintained at 90–100° C. for 2.5 hours. The reactor is cooled to its original starting temperature and opened with care. The contents of the reactor are diluted with excess water and neutralized with dilute hydrochloric acid to precipitate a solid which, after recovery and purification, is identified as the desired triazine.

EXAMPLE 4

*Preparation of 2,4,6-tricyclohexylcyanomethylamino-1,3,5-triazine*

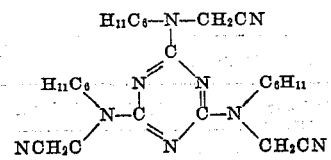

| Reactants | Molar Ratio |
|---|---|
| Cyanuric chloride | 1.0 |
| Dioxane | 7.0 |
| Cyclohexylaminoacetonitrile | 3.0 |
| Sodium hydroxide | 3.0 |
| Water | 5.5 |

The aminonitrile is added to the dioxane solution of cyanuric chloride at such a rate that the temperature does not exceed 60° C. After completing this addition the aqueous NaOH is added at such a rate that the temperature does not exceed 50° C. and any amine salt which may be present will dissolve. When the solution becomes clear, it is refluxed until no longer strongly alkaline. This reaction mixture is diluted with water and the oil, which separates, solidifies. After recovery and purification the colorless, odorless, crystalline solid melts at 165–167° C. The compound is soluble in alcohol, acetone, benzene, and dilute acid, but insoluble in water.

EXAMPLE 5

*Methods of preparing 2,4-diamino-6-cyanomethyl-amino-1,3,5-triazine*

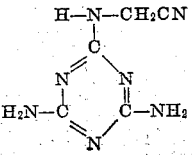

(a)

| Reactants | Molar Ratio |
|---|---|
| 2,4-Diamino-6-chloro-1,3,5-triazine | 1.0 |
| Glycinonitrile | 2.0 |

The procedure for preparing this triazine is the same as that described in Example 1(b). After recovery and recrystallization from water a colorless crystalline dihydrate melting at 220–225° C. is obtained. The water of hydration may be removed by heating the crystals in a vacuum oven at a temperature below the melting point. The compound is soluble in water, alcohol, and dilute acids, but insoluble in hydrocarbon type solvents.

(b)

| Reactants | Molar Ratio |
|---|---|
| 2,4-Dichloro-6-cyanomethylamino-1,3,5-triazine | 1.0 |
| Aqueous ammonia, conc. | 5.0 |

The dichlorotriazine and the aqueous ammonia are mixed in the reactor at a temperature below 10° C. The reactor is sealed and heated at 90–100° C. for two hours, after which it is cooled to a temperature below 10° C. prior to opening the reactor. The solid which crystallizes from the reaction mixture is identified after recovery and recrystallization as the desired triazine.

EXAMPLE 6

*Methods of preparing 2,4-bis-cyanomethylamino-6-dodecylamino-1,3,5-triazine*

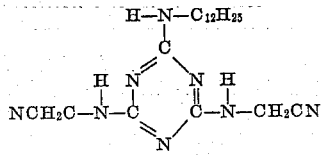

(a)

| Reactants | Molar Ratio |
|---|---|
| 2,4-Dichloro-6-dodecylamino-1,3,5-triazine | 1.0 |
| Glycinonitrile | 4.0 |

The procedure for preparing this triazine is the same as that described in Example 1(a). After recovery and purification the colorless, -odorless, crystalline solid melts at 145–150° C. This compound is soluble in most organic solvents and dilute acids, but is insoluble in water.

(b)

| Reactants | Molar Ratio |
|---|---|
| 2-Chloro-4,6-bis-cyanomethylamino-1,3,5-triazine | 1.0 |
| Cellosolve | 15.5 |
| Dodecylamine | 2.0 |

The triazine is suspended in the Cellosolve, and the dodecylamine is added. After refluxing for 2 hours a clear, dark-colored solution is obtained. After the reaction mixture is diluted with water and neutralized with sodium bicarbonate, a gummy solid separates, which, after recovery and recrystallization, is identified as the desired triazine.

EXAMPLE 7

Methods of preparing 2-di-β-cyanoethylamino-4,6-bis-phenylamino-1,3,5-triazine

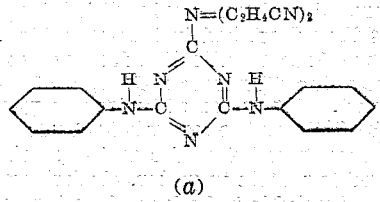

(a)

| Reactants | Molar Ratio |
|---|---|
| 2-Chloro-4,6-bis-phenylamino-1,3,5-triazine | 1.0 |
| Iminodipropionitrile | 2.0 |

The general procedure disclosed in Example 1(b) is used to prepare this triazine. After recovery and purification the colorless, crystalline solid melts at 180–183° C. This compound is soluble in alcohol, benzene, and dilute acids, but insoluble in water.

(b)

| Reactants | Molar Ratio |
|---|---|
| Cyanuric chloride | 1.0 |
| Acetone | 5.5 |
| Iminodipropionitrile | 1.0 |
| Sodium bicarbonate | 1.0 |
| Water | 22.0 |
| Aniline | 2.0 |
| Cellosolve | 10.4 |
| Sodium bicarbonate | 2.0 |

The cyanuric chloride is dissolved in acetone and cooled to 5–10° C. The iminodipropionitrile is added at such a rate that this temperature range is maintained. The aqueous sodium bicarbonate is then added slowly at the same temperature range. When the solution becomes clear, the aniline, Cellosolve, and the second portion of solid sodium bicarbonate are added to the reaction mixture. This mixture is heated to substantially 100° C. for 4 hours, during which time the acetone is distilled out of the reaction mixture. After the reaction is complete some of the triazine has precipitated, and the dissolved portion is completely precipitated by the addition of more water. After recovery and purification the crystalline solid is identified as the desired triazine.

(c)

| Reactants | Molar Ratio |
|---|---|
| 2,4-Dichloro-6-di-β-cyanoethylamino-1,3,5-triazine | 1.0 |
| Cellosolve | 10.4 |
| Aniline | 4.0 |

The dichlorotriazine is suspended in the Cellosolve, and one half of the aniline is added carefully at 50° C. Occasional cooling may be necessary if the addition rate becomes too rapid. The second half of the aniline is added to the reaction mixture, and the temperature raised to and maintained at substantially 100° C. for 2–3 hours. After the reaction is complete, the reaction mixture is diluted with water to precipitate a solid and dissolve any aniline hydrochloride which separates. After recovery and purification the compound is identified as the desired triazine.

EXAMPLE 8

Methods of preparing 2 - amino - 4,6 - bis - di-β-cyanoethylamino-1,3,5-triazine

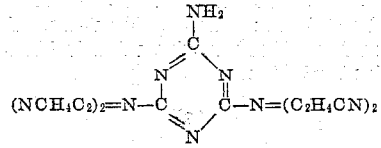

(a)

| Reactants | Molar Ratio |
|---|---|
| 2-Amino,4-6-dichloro-1,3,5-triazine | 1.0 |
| Water | 83.0 |
| Iminodipropionitrile | 2.0 |
| Sodium bicarbonate | 2.0 |

The finely divided dichlorotriazine is suspended in the water and the nitrile is carefully added. The solid sodium bicarbonate is added carefully to the heated reaction mixture, which is stirred vigorously and maintained at 90° C. for 3 hours. When the reaction mixture is cool, the desired triazine is recovered. After purification the colorless, odorless, crystalline solid melts at 210–212° C. This compound is soluble in alcohol and dilute acids, but insoluble in most organic solvents.

(b)

| Reactants | Molar Ratio |
|---|---|
| 2-Chloro-4,6-bis-di-β-cyanoethylamino-1,3,5-triazine | 1.0 |
| Aqueous ammonia, conc. | 5.0 |

The procedure for preparing this compound is that described in Example 5(b). After recovery and purification the crystalline solid is identified as the desired triazine.

EXAMPLE 9

Preparation of 2,4,6 - tridodecylcyanomethylamino-1,3,5-triazine

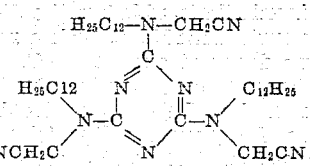

| Reactants | Molar Ratio |
|---|---|
| Cyanuric chloride | 1.0 |
| Acetone | 8.2 |
| Dodecylaminoacetonitrile | 3.0 |
| Sodium hydroxide | 3.0 |
| Water | 7.0 |

The aminonitrile is slowly added to the acetone solution of the cyanuric chloride so that the temperature does not rise above 35° C. Upon completion of this addition, the aqueous NaOH is added carefully and the clear solution which results is then diluted with water to precipitate the desired triazine. After recovery and purification the colorless, odorless, waxy, crystalline solid melts at 46–48° C. This compound is soluble in most organic solvents, and insoluble in water.

EXAMPLE 10

*Methods of preparing 2-cyanomethylamino-4-6-bis-phenylamino-1,3,5-triazine*

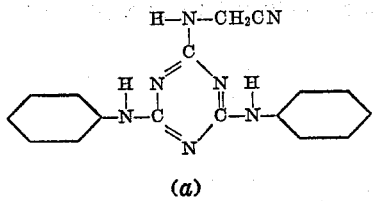

(a)

| Reactants | Molar Ratio |
|---|---|
| 2,4-Dichloro-6-cyanomethylamino-1,3,5-triazine | 1.0 |
| Acetone | 11.0 |
| Aniline | 2.0 |

The aniline is added to the acetone solution of the dichlorotriazine, and the temperature soon rises, because of the exothermic reaction, to the boiling point of the acetone. Occasional cooling may be necessary if the refluxing becomes too vigorous. After the reaction is completed, as indicated by a spontaneous drop in temperature, the reaction mixture is allowed to cool and stand at room temperature for an hour. The reaction mixture is then diluted with water, which causes an oil to separate. The mixture is stirred while 10% hydrochloric acid is added to cause the oil to solidify. After recovery and purification the colorless, odorless, crystalline solid melts at 168–172° C. This compound is soluble in benzene and alcohol, but insoluble in water.

(b)

| Reactants | Molar Ratio |
|---|---|
| 2-Chloro-4,6-bis-phenylamino-1,3,5-triazine | 1.0 |
| Glycinonitrile | 2.0 |

The procedure for the preparation of this triazine is the same as that described in Example 1(b). After recovery and purification the crystalline solid is identified as the desired triazine.

While the invention has been described with particular reference to specific embodiments, it is to be understood that it is not to be limited thereto but is to be construed broadly and restricted solely by the scope of the appended claims.

What is claimed:

1. A compound of the formula

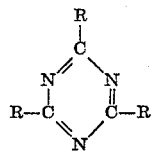

where at least one R is a cyanoalkylamino radical and the remaining R's are selected from the group consisting of amino, alkylamino, cycloalkylamino, and arylamino.

2. A method of preparing a compound of the formula

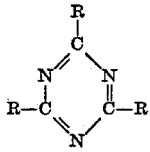

where at least one R is a cyanoalkylamino radical and the remaining R's are selected from the group consisting of amino, alkylamino, cycloalkylamino, and arylamino, which comprises reacting a cyanoalkylamine with a compound of the formula

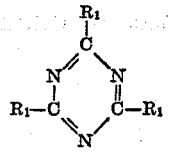

where at least one $R_1$ is a chlorine radical and the remaining $R_1$'s are selected from the group consisting of amino, cyanoalkylamino, alkylamino, cycloalkylamino, and arylamino.

3. 2,4 - diamino-6-cyanomethylamino-1,3,5-triazine of the formula:

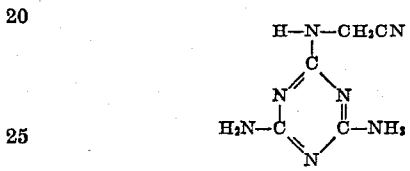

4. A method of preparing 2,4-diamino-6-cyanomethylamino-1,3,5-triazine which comprises reacting glycinonitrile with 2,4-diamino-6-chloro-1,3,5-triazine and recovering the 2,4-diamino-6-cyanomethylamino-1,3,5-triazine obtained.

5. A method of preparing 2,4-diamino-6-cyanomethylamino-1,3,5-triazine which comprises reacting glycinonitrile with cyanuric chloride in phenol at a temperature below 135° C., and recovering the 2,4-diamino-6-cyanomethylamino-1,3,5-triazine obtained.

6. 2 - amino - 4,6 - bis - di-β-cyanoethylamino-1,3,5-triazine of the formula:

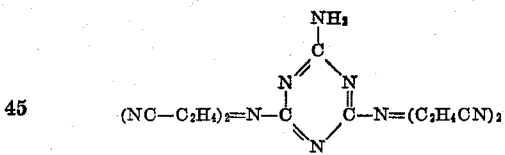

7. A method of preparing 2-amino-4,6-bis-di-β-cyanoethylamino - 1,3,5 - triazine which comprises reacting iminopropionitrile with 2-amino-4,6-dichloro-1,3,5-triazine, and recovering the 2-amino - 4,6 - bis-di-β-cyanoethylamino-1,3,5-triazine.

8. A method of preparing 2-amino-4,6-bis-di-β-cyanoethylamino - 1,3,5 - triazine which comprises reacting iminopropionitrile with an aqueous suspension of 2-amino-4,6-dichloro-1,3,5-triazine at a temperature below 110° C., and recovering the 2-amino-4,6-bis-di-β-cyanoethylamino-1,3,5-triazine obtained.

9. 2,4,6-tridodecylcyanomethylamino-1,3,5-triazine of the formula:

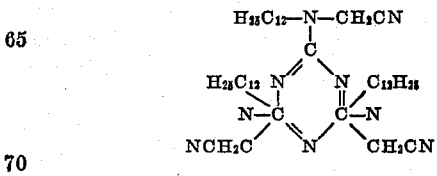

10. A method of preparing 2,4,6-tridodecylcyanomethylamino-1,3,5-triazine which comprises reacting dodecylaminoacetonitrile with cyanuric chloride, and recovering the 2,4,6-tridodecylcyanomethylamino-1,3,5-triazine obtained.

11. A method of preparing 2,4,6-tridodecylcyanomethylamino-1,3,5-triazine which comprises reacting dodecylaminoacetonitrile with an aqueous acetone solution of cyanuric chloride at a temperature below 110° C., and recovering the 2,4,6-tridodecylcyanomethylamino-1,3,5-triazine obtained.

INGENUIN HECHENBLEIKNER.

REFERENCES CITED

The following references are of record in the file of this patent:

Chemical Abstracts, vol. 31, page 1010.
Compte Rendu, vol. 203, pp. 568–70 (1936).